(12) United States Patent
Alharbi et al.

(10) Patent No.: US 11,582,193 B2
(45) Date of Patent: Feb. 14, 2023

(54) SYSTEM AND METHOD FOR SECURELY INTERCONNECTING BRANCH NETWORKS TO ENTERPRISE NETWORK THROUGH TSPS

(71) Applicant: Saudi Arabian Oil Company, Dhahran (SA)

(72) Inventors: Ahmad A. Alharbi, Khobar (SA); Mohammed I. Alghannam, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 173 days.

(21) Appl. No.: 16/572,306

(22) Filed: Sep. 16, 2019

(65) Prior Publication Data
US 2021/0084010 A1  Mar. 18, 2021

(51) Int. Cl.
*H04L 9/40* (2022.01)

(52) U.S. Cl.
CPC ...... *H04L 63/0263* (2013.01); *H04L 63/0272* (2013.01); *H04L 63/062* (2013.01); *H04L 63/104* (2013.01); *H04L 63/1416* (2013.01); *H04L 63/1441* (2013.01); *H04L 63/20* (2013.01)

(58) Field of Classification Search
CPC ............. H04L 63/0263; H04L 63/0272; H04L 63/062; H04L 63/104; H04L 63/1416; H04L 63/1441; H04L 63/20; H04L 63/1408
See application file for complete search history.

(56) References Cited

U.S. PATENT DOCUMENTS

| 7,075,933 B2 | 7/2006 | Aysan |
| 7,894,430 B2 | 2/2011 | Maalouf et al. |

(Continued)

FOREIGN PATENT DOCUMENTS

WO    2014008846 A1    1/2014

OTHER PUBLICATIONS

Haseeb Niazi, et al., "Group Encrypted Transport VPN (GETVPN) Design and Implementation Guide" (https://www.cisco.com/c/dam/en/us/products/collateral/security/group-encrypted-transport-vpn/GETVPN_DIG_version_2_0_External.pdf).

(Continued)

*Primary Examiner* — Cheng-Feng Huang
(74) *Attorney, Agent, or Firm* — Leason Ellis LLP

(57) ABSTRACT

A system, a method, and a computer program are provided for securely connecting a main network to one or more subnetworks in an enterprise network through a group of enterprise routers has all data traffic routed between the main network and the subnetwork through an encrypted virtual private network (VPN) tunnel. The data traffic is monitored for a cyberthreat indication in the enterprise network, and any cyberthreat indication is has the cyberthreat remediated by modifying a policy in a firewall or one of the group of enterprise routers to stop routing exchange or cease encryption or transmission of data between the main network and the one or more subnetworks. In part, a key server and each router and the group of enterprise routers is configured with an Internet Protocol address, a group security association value, and a group profile which are employed by the technological solution for secure enterprise connectivity.

20 Claims, 5 Drawing Sheets

(56) References Cited

U.S. PATENT DOCUMENTS

| | | | |
|---|---|---|---|
| 8,144,624 B2 | 3/2012 | Natarajan et al. | |
| 8,307,442 B2 | 11/2012 | Asati et al. | |
| 8,447,039 B2 | 5/2013 | Khalid et al. | |
| 8,850,521 B2 | 9/2014 | Khalid et al. | |
| 9,054,990 B2* | 6/2015 | Davis | H04L 67/60 |
| 2008/0047011 A1* | 2/2008 | Asati | H04L 63/145 |
| | | | 726/23 |
| 2010/0064137 A1 | 3/2010 | McGrew et al. | |
| 2012/0151057 A1* | 6/2012 | Paredes | H04L 12/4641 |
| | | | 709/225 |
| 2012/0297042 A1* | 11/2012 | Davis | H04L 41/046 |
| | | | 709/223 |
| 2013/0074174 A1* | 3/2013 | Huang | H04L 45/04 |
| | | | 726/12 |
| 2013/0215768 A1* | 8/2013 | Meloche | H04L 41/50 |
| | | | 370/252 |
| 2016/0191341 A1* | 6/2016 | Sivasankaran | H04L 41/5051 |
| | | | 709/220 |
| 2016/0330230 A1* | 11/2016 | Reddy | H04L 63/14 |
| 2017/0013008 A1* | 1/2017 | Carey | H04L 63/02 |
| 2017/0134422 A1* | 5/2017 | Shieh | H04L 63/1408 |
| 2017/0195349 A1* | 7/2017 | Shabtai | H04L 63/1433 |
| 2017/0324709 A1* | 11/2017 | Ahn | H04L 63/1408 |
| 2018/0124072 A1* | 5/2018 | Hamdi | H04L 63/1416 |
| 2019/0182288 A1* | 6/2019 | Reddy | G06F 9/45533 |

OTHER PUBLICATIONS

Cisco Confidential Presentation: "Cisco Group Encrypted Transport VPN—Technical Overview", Dec. 2006, https://cisco.com/c/dam/en/us/products/collateral/security/group-encrypted-transport-vpn/prod_presentation0900aecd8058203e.pdf. 32 pages.

International Search Report and Written Opinion in Corresponding PCT Application No. PCT/US2020/050295 dated Nov. 24, 2020. 13 pages.

* cited by examiner

SYSTEM AND METHOD FOR SECURELY INTERCONNECTING BRANCH NETWORKS TO ENTERPRISE NETWORK THROUGH TSPS

FIELD OF THE DISCLOSURE

The present disclosure relates to a system, method and computer program for securely interconnecting one or more branch networks to an enterprise network through a telecommunication service provider network.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, and optical networking technologies. The Internet carries a broad range of information resources and services, including the World Wide Web (WWW), electronic mail, telephony, and file sharing.

As the Internet evolves and network systems become increasingly under attack, technology solutions such as virtual private networks (VPNs) are taking on greater importance. A VPN can extend a private network across a public network such as the Internet and provide secure communication between communicating devices by establishing a secure point-to-point connection between the devices. VPNs typically implement tunneling and encryption technologies to prevent unauthorized access to the data carried between the communicating devices.

Early on, private network systems were built using dedicated hardware and electrical communication lines. These early network systems proved to be expensive to build and maintain. So, when less costly Frame Relay (FR) and Asynchronous Transfer Mode (ATM) technologies became available, network developers looked to these technologies to provide virtual circuits to carry data between communicating devices. Typically, these virtual circuits are provided by networks that are owned and operated by service providers such as, for example, telecommunications carriers. Due to significant limitations of FR/ATM-based network systems, however, these technologies are being replaced by IP-based VPN technology solutions such as IP tunneling and IP/Multi-Protocol Label Switching (MPLS) technologies.

MPLS technology has become the de-facto standard IP-based transport technology used by enterprises and telecommunication service providers worldwide. Telecommunication service providers rely heavily on this technology to transport data packets having different types of protocols and services for different types of end users on a single converged IP-based infrastructure. Enterprise networks also employ MPLS technology to serve enterprise users with differing requirements. One of the reasons that MPLS technology is so popular is its ability to host several VPNs on a single IP backbone while providing logical segregation between them. However, MPLS technology has some significant shortcomings that are addressed by the technology solution provided in this disclosure.

SUMMARY OF THE DISCLOSURE

The disclosure provides an IP-based technology solution, including a method, a system, and a computer program therefor, that provides secure, flexible and efficient virtual private network connectivity in a network. According to an aspect of the disclosure, a method is provided for securely connecting a main network to one or more subnetworks in an enterprise network through a group of enterprise routers. The method can comprise: configuring a key server with an Internet Protocol (IP) address for each router in the group of enterprise routers, a group security association (SA) value for the group of enterprise routers, and a group profile for the group of enterprise routers; configuring each router in the group of enterprise routers with an Internet Protocol (IP) address for the key server and the group security association (SA) and the group profile; creating an encrypted virtual private network (VPN) tunnel between the main network and a subnetwork; routing all data traffic between the main network and the subnetwork through the encrypted virtual private network (VPN) tunnel; monitoring for a cyberthreat indication in the enterprise network; and remediating a cyberthreat based on the cyberthreat indication, wherein remediating the cyberthreat comprises modifying a policy in a firewall or one of the group of enterprise routers to stop routing exchange or cease encryption or transmission of data between the main network and the one or more subnetworks.

The method can comprise classifying a community of network users in a Virtual Routing and Forwarding (VRF) domain that includes all routes between the main network and the one or more subnetworks into a User-U instance, a User-SP1 instance and a User-SP2 instance, where the User-U instance represents network users in the main network and the User-SP1 and User-SP2 instances represent network users in two subnetworks.

The method can comprise defining a set of Border Gateway Protocol (BGP) extended community attributes.

The method can comprise defining a Border Gateway Protocol (BGP) extended community attribute, wherein the BGP extended community attribute comprise a number value that identifies a unicast route originated from one of the User-U, User-SP1 or User-SP2 instances.

The method can comprise defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of User-SP1 and User-SP2 instances to the User-U instance together with the BGP extended community attribute.

The method can comprise defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of the User-U instance to the User-SP1 and User-SP2 instances together with the BGP extended community attribute.

The method can comprise defining a router policy in said one of the group of enterprise routers using MultiProtocol Label Switching (MPLS) Virtual Routing and Forwarding (VRF) route import or export policies. The router policy can instruct said one of the group of enterprise routers to export all routes of User-SP1 and User-SP2 instances to a User-U instance, where the User-U instance represents network users in the main network and the User-SP1 and User-SP2 instances represent network users in two subnetworks. The router policy can instruct said one of the group of enterprise routers to export all routes of a User-U instance to User-SP1 and User-SP2 instances, where the User-U instance represents network users in the main network and the User-SP1 and User-SP2 instances represent network users in two subnetworks.

The group profile can comprise a Group Domain of Interpretation (GDOI) profile.

The method can comprise classifying users in the enterprise network with different Virtual Routing and Forwarding (VRF) using MultiProtocol Label Switching into a User-U instance, a User-SP1 instance and a User-SP2 instance, where the User-U instance represents users in the main network and the User-SP1 and User-SP2 instances represent users in two subnetworks.

The User-SP1 and User-SP2 instances include private isolated Virtual Routing and Forwarding (VRF) instances that comprise respective ports on said one of the group of enterprise routers facing the two subnetworks and an interface in a router hosting the firewall.

The firewall can be positioned in the main network where all data traffic requiring to cross from one user group to another user group in the User-U, User-SP1 or User-SP2 instances must pass through the firewall.

The firewall can comprise a policy that determines whether to allow routes exchanges between User-U, User-SP1 or User-SP2 instances.

According to another aspect of the disclosure, a system is provided for securely connecting a main network to one or more subnetworks in an enterprise network through a group of enterprise routers, including a router that creates a virtual private network (VPN) tunnel between the main network and a subnetwork. The system comprises a key server having a GETVPN unit that includes an Internet Protocol (IP) address for each router in the group of enterprise routers, a group security association (SA) value for the group of enterprise routers, and a group profile for the group of enterprise routers, an L3VPN manager that works with the GETVPN unit to configure each router in the group of enterprise routers with an Internet Protocol (IP) address for the key server and the group security association (SA) and the group profile, and a cyberthreat remediator that listens for a cyberthreat indication and, upon receiving a cyberthreat notification, modifies a policy in a firewall or said router to stop routing exchange or cease encryption or transmission of data between the main network and the subnetwork.

According to a further aspect of the disclosure, a non-transitory computer readable storage medium is provided that stores network connectivity program instructions for securely connecting a main network to one or more subnetworks in an enterprise network through a group of enterprise routers. The program instructions comprise the steps of: configuring a key server with an Internet Protocol (IP) address for each router in the group of enterprise routers, a group security association (SA) value for the group of enterprise routers, and a group profile for the group of enterprise routers; configuring each router in the group of enterprise routers with an Internet Protocol (IP) address for the key server and the group security association (SA) and the group profile; creating an encrypted virtual private network (VPN) tunnel between the main network and a subnetwork; routing all data traffic between the main network and the subnetwork through the encrypted virtual private network (VPN) tunnel; monitoring for a cyberthreat indication in the enterprise network; and remediating a cyberthreat based on the cyberthreat indication, wherein remediating the cyberthreat comprises modifying a policy in a firewall or one of the group of enterprise routers to stop routing exchange or cease encryption or transmission of data between the main network and the one or more subnetworks.

The program instructions can comprise the further step of classifying a community of network users in a Virtual Routing and Forwarding (VRF) domain that includes all routes between the main network and the one or more subnetworks into a User-U instance, a User-SP1 instance and a User-SP2 instance, where the User-U instance represents network users in the main network and the User-SP1 and User-SP2 instances represent network users in two subnetworks.

The program instructions can comprise the further step of defining a Border Gateway Protocol (BGP) extended community attribute, wherein the BGP extended community attribute comprise a number value that identifies a unicast route originated from one of the User-U, User-SP1 or User-SP2 instances.

The program instructions can comprise the further step of defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of User-SP1 and User-SP2 instances to the User-U instance together with the BGP extended community attribute.

The program instructions can comprise the further step of defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of the User-U instance to the User-SP1 and User-SP2 instances together with the BGP extended community attribute.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
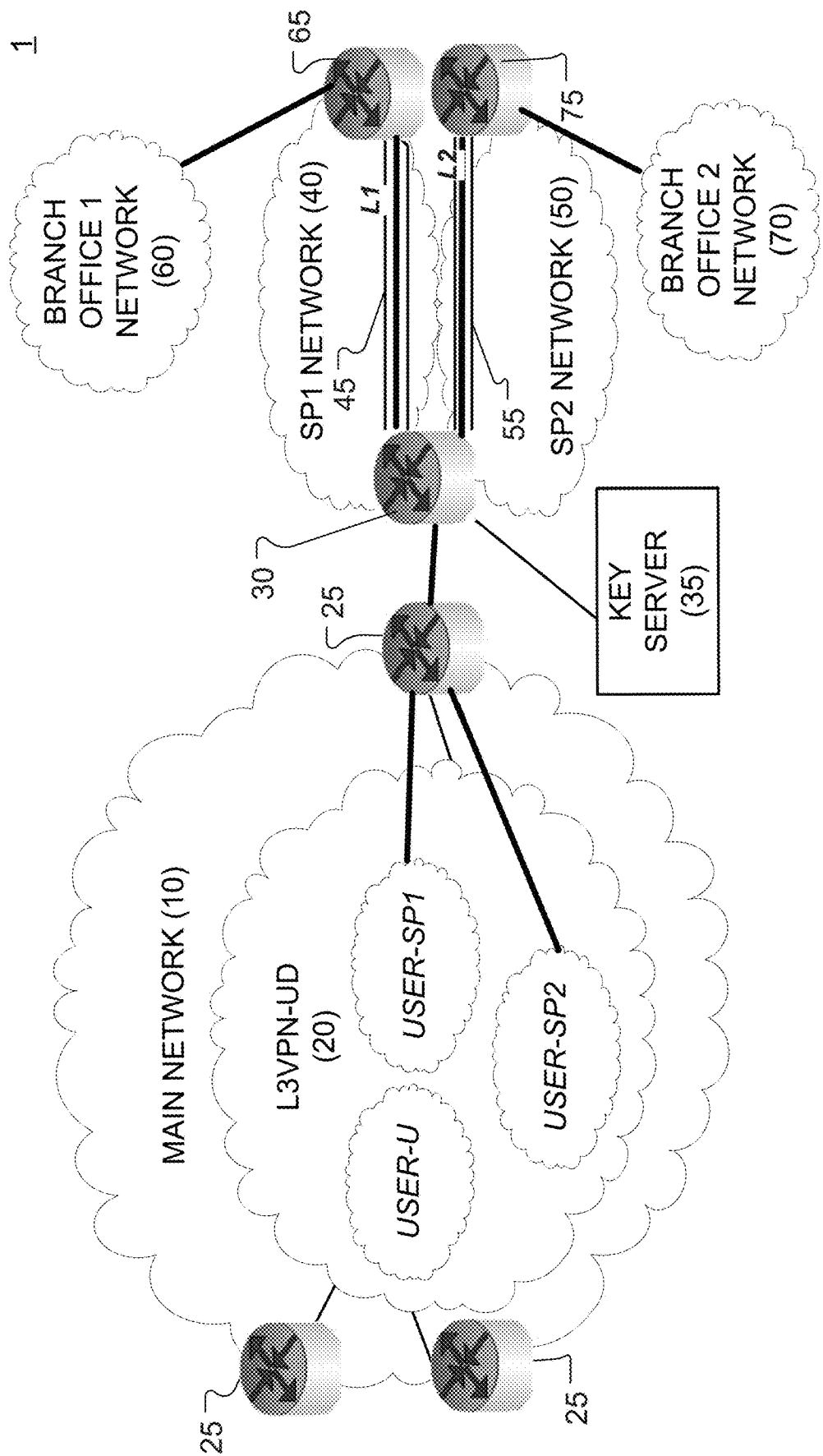
FIG. 1 shows an example of an enterprise network environment including a technological solution according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

In a typical service provider (SP) environment, a VPN instance can exist per network user in the SP's MPLS backbone and hardly require intercommunication with VPNs of other network users on the same MPLS backbone. However, in an enterprise environment, where the enterprise owns the MPLS backbone infrastructure, such total and isolated separation might not be so clear-cut or possible due to the fact that the enterprise as the core network owner is also a VPN network user, providing logical segregation to different organizations within the enterprise network backbone while at the same time hosting services and resources, some of which might be serving all the enterprise network users regardless of which VPN they belong to on an enterprise MPLS core network. In such instances, total separation may not be possible because the enterprise network may use Open Systems Interconnection Model (OSI Model) Level-3 VPNs (or L3VPNs) in the enterprise MPLS core network for branch office network users to gain access to computing resources located in the enterprise main office network. Unlike Layer-2 VPNs, L3VPNs typically employ unique virtual routers for each L3VPN instance that links computing resources in the enterprise main office network to a branch office network user.

Generally, L3VPNs are not configured as separate routers in the enterprise MPLS core network but, instead, can be configured using, for example, a common command-line interface (CLI) and a common configuration file. A single CLI and a single configuration file can be used for all branch network users associated with a particular VPN line hosted by the SP, such as, for example, the lines L1 or L2 hosted by SP1 40 or SP2 50 (shown in FIG. 1 or 4). If the virtual router management function, which can include the CLI or configuration file, for a given L3VPN router becomes infected or compromised, then other communicating devices or computing resources in the enterprise network could become at risk. The inventors have discovered that there are significant security risks associated with hosting multiple Layer-3 VPN (L3VPN) instances, such as, for example, Virtual Routing and Forwarding (VRF) instances, on the MLS backbone of an enterprise network while at the same time interfacing with L3VPN instances from one or more SP networks connecting the enterprise central office network to one or more enterprise branch office networks. In this disclosure, the inventors provide a technological solution that can mitigate security risks that otherwise could severely compromise or damage an enterprise main office network, or its branch office networks.

FIG. 1 shows a non-limiting example of an enterprise network environment 1 provided with a technological solution according to the principles of the disclosure. The enterprise network environment 1 can include a main network 10 and one or more subnetworks 60, 70. The main network 10 can include an enterprise main office network 10 and the subnetworks 60, 70 can include enterprise branch office networks 60, 70 that connect to the main office network 10 via one or more service provider (SP) networks SP1 40 and SP2 50. The terms main network and main office network are used interchangeably, as are the terms subnetworks and branch office networks. In this example, the enterprise environment 1 includes a pair of branch office networks 60, 70, each of which is connected to the main office network 10 via respective SP1 and SP2 networks 40, 50. The main network 10 can include an MPLS backbone that can host a L3VPN user domain (L3VPN-UD) 20 on the network's MPLS backbone, including a plurality of L3VPN instances. Only three L3VPN instances are shown in this example for the sake of simplicity, but any number of L3VPN instances can be hosted by the MPLS backbone in the main office network 10. The three L3VPN instances include User-U, User-SP1, and User-SP2 instances, where the User-U instance represents enterprise network users and User-SP1 and User-SP2 instances represent users in the branch office networks 60, 70, respectively. While only two SP networks SP1 40 and SP2 50 are shown for the sake of simplicity, the enterprise network environment 1 can include any number of SP networks. The MPLS core network in the main office network 10 backbone can be responsible for the transmission of data across the enterprise network environment 1, including between router interfaces in the same VRF instance.

The MPLS core network, which can be hosted on the backbone of the main office network 10, can include a plurality of MPLS routers, including multiple provider edge (PE) routers 25, one or more provider (P) routers (not shown) and multiple customer edge (CE) routers, including CE router 30, 65 or 75. The CE router 30 can handle local routing and disseminate routing information into the PE routers 25 or CE routers 65, 75, where the routing tables can be virtualized. The CE router 30 can be connected to a key server 35. The CE routers 65 or 75 can be connected to the key server 35. An MPLS router can encapsulate data traffic, mark the data packets to identify the L3VPN (e.g., VRF) instance, and transmit the data packets across the MPLS core network to the destination MPLS router. The destination MPLS router can then parse the data packets and forward them to the enterprise MPLS router at the destination. Routes learned by one MPLS router can be advertised or distributed and learned by other MPLS routers.

The CE router 30 can include a policy for incoming data that specifies IP addresses belonging to SP1 40 should be part of User-SP1 and IP addresses belonging to SP2 50 should be part of User-SP2 instances. Accordingly, users at each site can be isolated via the CE router 30 to the main network 10. User-U, User-SP1, and User-SP2 communities can be tagged in the policies in, for example, the CE router 30.

A link between CE router 30 and PE router 25 can be segregated logically by creating a sub-interface for each L3VPN instance between the PE router 25 and CE router 30.

The MPLS core network can be completely transparent to communicating devices or computing resources in the enterprise network environment 1, allowing multiple communicating devices of user communities to utilize the common backbone network while maintaining end-to-end traffic separation. Routes across the MPLS core network can be maintained using an interior gateway protocol, such as, for example, interior Boarder Gateway Protocol (IBGP) that uses extended community attributes in a common routing table to differentiate the network user routes with overlapping IP addresses. One or more IP VPNs can be deployed across the MPLS core network for labeling data packets and identifying network user L3VPNs.

The gateway CE router 30 can be connected to one or more branch office network CE routers 65, 75, which can be dedicated for the branch office networks 60, 70, respectively. The gateway CE router 30 or key server 35 can be located on premises in the same location as the main office network 10 or at a remote location, such as, for example, a location where the SP1 or SP2 networks 40, 50 are located. The CE routers 65, 75 can be located on premises in the same locations as the branch office networks 60, 70, respectively, or at remote locations, such as, for example, locations where the SP1 and SP2 networks 40, 50, respectively, are located. One or more of the CE routers 30, 65 or 75 can be owned or managed by the enterprise or owned or managed by the SP1 or SP2 networks. Routes learned by one CE router can be advertised and learned by other CE routers. The MPLS core network and SP1 and SP2 networks 40, 50 can securely interconnect one or more branch office networks 60, 70 to the main office network 10 to provide branch office network users in User-SP1 and User-SP2 instances with access to computing resources in the main office network 10, or main office network users in User-U instances with access to computing resources in the branch office networks 60 or 70. This unique design allows network users in User-U, User-SP1 and User-SP2 instances to access the computing resources in the main network 10, while mitigating cybersecurity risks and vulnerabilities in the enterprise network environment 1.

The network user domain L3VPN-UD 20 can dedicate User-U instances for users in the main network 1 and dedicate User-SP1 and User-SP2 instances for hosting branch office network users in branch office networks 60, 70 that are permitted to access the computing resources located in the main network 10. The L3VPN-UD 20 can facilitate any-to-any communication amongst its components, including all enterprise network users' communicating devices. The L3VPN-UD 20 can include SP lines L1 and L2 provided by SP1 and SP2 networks 40, 50 to facilitate interconnectivity between the branch office networks 60, 70 and the main network 10, allowing for branch office network users in User-SP1 and User-SP2 instances to use the computing resources located in the main network 10, or allow main network users in the User-U instance to use computing resources in the branch office networks 60, 70. The SP lines L1 and L2 can include OSI Model Layers 1 or 2 communication lines.

The L3VPN-UD 20 can connect to the SP1 and SP2 networks 40, 50 via the gateway CE router 30, and the SP1 and P2 networks 40, 50 can connect to the branch office networks 60, 70 via CE routers 65, 75. At the gateway CE router 30, data traffic can be encrypted before being transmitted on the SP lines L1 or L2 to MPLS CE routers 65 and 75 for transmission to the branch office networks 60, 70, respectively, or the data traffic can be received in encrypted form and routed by the CE router 30 to the CE routers 65, 75. The SP lines L1 and L2 can include OSI Model Layer 2 VPNs (L2VPNs). For data traffic received at the gateway CE router 30 from CE routers 65 or 75, the data packets can be decrypted at the CE router 30 before being transmitted to enterprise routers in the main office network 10, or the data traffic can be received in encrypted form and transmitted as encrypted data to the main office network 10, where the data packets can be decrypted.

The enterprise network environment 1 includes an embodiment of the technological solution that can mitigate or remediate security risks or vulnerabilities associated with hosting multiple L3VPN instances simultaneously on the same MPLS core network in the backbone of the main office network 10, while at the same time interfacing with L3VPN instances from SP1 and SP2 networks 40, 50, which can connect the main office network 10 with the branch office networks 60, 70. The technological solution can include applying encryption technology between network communicating devices, such as the CE routers 30, 65, 75, to ensure confidentiality and create multiple L3VPNs while capitalizing on some of the fundamental ways of implementing a protocol such as, for example, MBGP (Multi-protocol Border Gateway Protocol) to propagate routing information in the MPLS core network infrastructure in the enterprise network environment 1 with a rich set of extended community attributes that can be attached to routes belonging to L3VPNs. The technological solution can provide a secure way to mitigate the spread of cyberthreats such as malware or cyberattacks from the main office network 10 side to the branch office network 60/50 side or vice versa while at the same time satisfying network traffic flow constraints in the enterprise network environment 1.

In a non-limiting embodiment, all data traffic travelling between the main office network 10 and the branch office networks 60, 70 can be encrypted using Group Encrypted Transport (GET) VPN (or GETVPN) encryption. In this embodiment, the technological solution can include a key generator in the key server 35 and a Group Domain of Interpretation (GDOI) based protocol. In the enterprise network environment 1 (or enterprise network environment 2, shown in FIG. 4), each of the CE routers 30, 65, and 67 is a group member (GM) that can share a common or group security association (SA) to allow the receiving CE router to decrypt data that was encrypted by the transmitting CE router. Since the GETVPN is tunnel-less, the CE routers (or GMs) 30, 65, 67 do not have any need to negotiate point-to-point Internet Protocol Security (IPsec) tunnels at the IP layer. The CE routers 30, 65, 67 can encrypt or decrypt data travelling across the SP1 and SP2 networks 40, 50, and the key server 35 can distribute an encryption key to all the CE routers 30, 65, 67. The key server 35 can decide on a single data encryption key for a given life time. A life time can be set to, for example, a 24 hour period for increased security, or less than 24 hour period where a heightened security risk might exist. It is noted that the life time can be set to periods greater than 24 hours.

Since all group member CE routers 30, 65, 75 can use the same key, any CE router can decrypt the traffic encrypted by any other CE router in the group SA where the same key is used. The GDOI-based protocol can be used between the CE router 30 (or 65 or 67) and the key server 35 for group key and group SA management. The enterprise network environment 1 can include at least one key server 35 for GDOI-based protocol deployment. However, for redundancy, the enterprise network environment 1 can be provided with multiple key servers (not shown) in different locations in the enterprise network environment 1. For instance, one or more of the branch office networks 60, 70 can include a key server 35. Unlike traditional IPsec encryption solutions, GDOI-based protocols can use group SAs, such that all group members in the group SA can communicate with each other using a common encryption policy and a shared SA. Accordingly, there is no need to negotiate an IPsec between CE routers 30, 65, 67 on a peer-to-peer basis since the CE routers, as group members in the SA, can communicate with each other using the common encryption policy and shared SA, thereby reducing resource loads on the CE routers 30, 65, 67.

The CE routers 30, 65, 67 and key server 35 can be authenticated using Internet Security Association Key Management Protocol (ISAKMP). Any standard ISAKMP authentication scheme can be used in most implementations, including, for example, a digital signature using an RSA (Rivest-Shamir-Adleman) public key algorithm or a pre-shared key. The key server 35 can be configured with the IP addresses of each CE router 30, 65, 67 and group SA, as well as the GDOI profile. Each CE router 30, 65, 67 can be configured with the IP address of the key server 35 and the group SA, as well as the GDOI profile. After all CE routers 30, 65, 67 and the key server 35 are configured, an encrypted VPN tunnel can be created in the lines L1 or L2 provided by SP1 or SP2 networks 40, 50, respectively, and all data traffic can be routed through the tunnel(s). The CE routers 30, 65, 75, can validate source and destination site communication privileges using, for example, a firewall or Authentication, Authorization and Accounting (AAA) system.

The routes between the main office network 10 and branch office networks 60, 70 can be altered using, for example, MPLS MBGP protocol. MPLS and MBGP can be combined such that MPLS is used for forwarding data and MBGP is used for controlling routes to construct secure VPNs that are easy to implement. In this regard, the network user community in the L3VPN-UD 20 can be classified into User-U, User-SP1 and User-SP2 instances, where, as noted above, the User-U instance represents main office network users and User-SP1 and User-SP2 instances represent users in the branch office networks 60, 70, respectively. It is noted that all routes for the branch office networks 60, 70 can be part of the L3VPN-UD 20. For example, the L3VPN-UD 20 can include a virtual routing and forwarding (VRF) table, which can include route labels, for each of the branch office networks 60, 70. Using MBGP, a set of BGP extended community attributes can be defined in a format such as, for example, target:VALUE1:VALUE2, where VALUE1 can be a unique number such as, for example, an Autonomous System number like a private or public number by IANA (Internet Assigned Numbers Authority), and VALUE2 can be a number chosen to uniquely identify a unicast route originated from the User-U, User-SP1 or User-SP2 instances.

The BGP extended community attributes can be included in, for example, a 32-bit data packet prefix and used for traffic engineering or dynamic routing policies. The BGP extended community attributes can include a plurality of default attributes, including, for example, "Internet," "no-advertise," "no-export," and "local-as" attributes, where "Internet" indicates whether a particular route can be advertised to neighbors, "no-advertise" indicates whether the particular route can be advertised to any peer, internal or external, "no-export" indicates whether the particular route can be advertised to external BGP peers, and "local-as" indicates whether the routs can be advertised outside a group SA. As noted above, the BGP extended community attributes can include an Autonomous System number and a unicast route identifier that can identify the source of origin.

Using, for example, MPLS VRF route import and export policies, a policy can be defined on the CE router 30 so that all routes in the User-SP1 and User-SP2 instances must be exported to the User-U instance and vice versa, attaching the unique BGP attribute defined for that VRF. In case of a cybthreat, such as a virus outbreak or network attack, the policy can be modified at the CE router 30, 65, or 75 to alter or stop routing exchange and alter or stop allowing data traffic to pass through the CE router.

Figure 2:
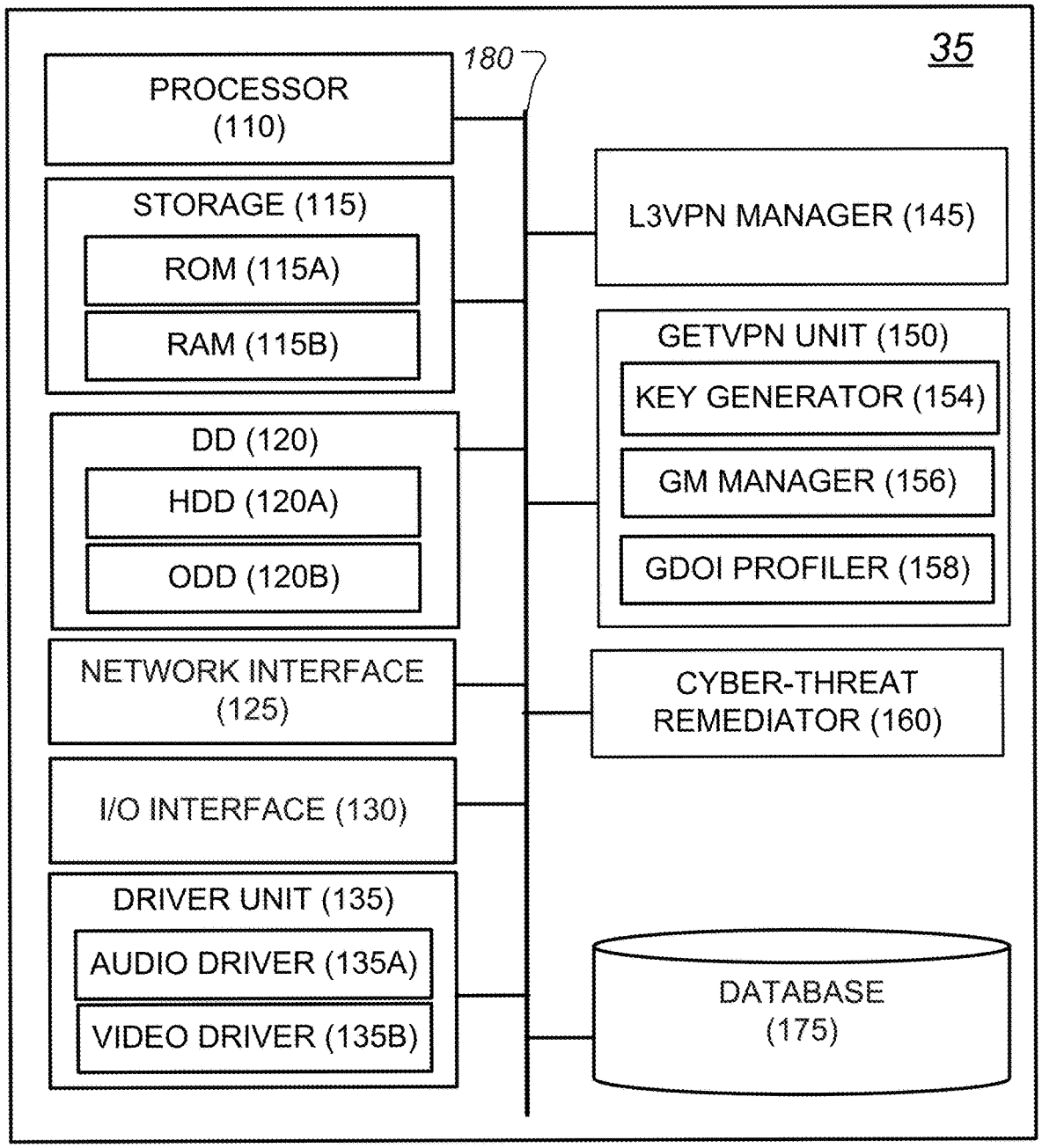
FIG. 2 shows an example of a key server constructed according to the principles of the disclosure.

FIG. 2 shows a non-limiting embodiment of the key server 35, according to the principles of the disclosure. As noted above, the key server 35 can be located in the main office network 10 (shown in FIG. 1) or outside the main office network such as, for example, in an SP network like the SP1 network 40 or SP2 network 50 (shown in FIG. 1). Although shown separate from the CE router 30, the key server 35 and CE router 30 can be formed as a single device. The key server 35 can be configured to implement the various aspects of the disclosure. The key server 35 can include a processor 110, a storage 115, a disk drive (DD) 120, a network interface 125, an input/output (I/O) interface 130, and a driver unit 135. The key server 35 can include a L3VPN manager 145. The L3VPN manager 145 can alternatively be located in the CE router 30, 65 or 75 (shown in FIG. 1). The key server 35 can further include a GETVPN unit 150 and a cyberthreat remediator 160. The key server 35 can include a database 175 and a system bus 180. The system bus 180 can be communicatively linked to each of the components 110 to 175 in the key server 135 by a communication link. Any one or more of the components 115 to 175 can include a device or a module that is separate from the processor 110, as seen in FIG. 2, or integrated or integrateable in a device(s) such as the processor 110. The key server 35 can include a sound generation device (not shown), such as, for example, a speaker, or a display device (not shown).

The system bus 180 can include any of several types of bus structures that can further interconnect to a memory bus (with or without a memory controller), a peripheral bus, and a local bus using any of a variety of commercially available bus architectures. The system bus 180 can include a backbone.

The processor 110 can include any of various commercially available graphic processing unit devices. Dual microprocessors and other multi-processor architectures can be included in the processor 110. The processor 110 can include a central processing unit (CPU) or a graphic processing unit (GPU). The processor 110 includes a computing device.

The key server 35 can include a computer-readable medium that can hold executable or interpretable computer code (or instructions) that, when executed by the processor 110 or one or more of the components (e.g., devices or modules) in the key server 35, causes the steps, processes and methods in this disclosure to be carried out. The computer-readable medium can be provided in the storage 115 or DD 120. The computer readable medium can include sections of computer code that, when executed cause the key server 35 to carry out a crypto process 200 (shown in FIG. 3) or crypto process 300 (shown in FIG. 5), as well as all other process steps described or contemplated in this disclosure.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the key server 35, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, a serial advanced technology attachments (SATA) drive, or the like; and, the ODD 120B can include, for example, a read/write from/to a CD-ROM disk (not shown), or, read from or write to other high capacity optical media such as a digital versatile disc (DVD). The HDD 120A can be configured for external use in a suitable chassis (not shown). The DD 120 can be connected to the system bus 180 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps that are used to execute aspects of the architecture described herein.

One or more program modules can be stored in the storage 115 or DD 120, including an operating system (not shown), one or more application programs (not shown), one or more application program interfaces (APIs), other program modules (not shown), and program data (not shown). The APIs can include, for example, web APIs, simple object access protocol (SOAP) APIs, remote procedure call (RPC) APIs, representation state transfer (REST) APIs, or other utilities and services APIs. Any (or all) of the operating system, application programs, program modules, and program data can be cached in the RAM 115B as executable sections of computer code.

The network interface 125 can be connected to a network such as the main office network 10, or the branch office networks 60 or 70 (shown in FIG. 1). The network interface 125 can be connected to one or more SP networks such as the SP1 network 40 or SP2 network 50. The network interface 125 can include a wired or a wireless communication network interface (not shown) or a modem (not shown). When used in a local area network (LAN), the key server 35 can be connected to the LAN network through the wired or wireless communication network interface; and, when used in a wide area network (WAN), the key server 35 can be connected to the WAN network through the modem. The networks 10, 40, 50, 60, or 70 (shown in FIG. 1) can include a LAN, a WAN, the Internet, or any other network. The modem (not shown) can be internal or external and wired or wireless. The modem can be connected to the system bus 180 via, for example, a serial port interface (not shown).

The network interface 125 can include a network router interface (not shown) that can communicate with the CE router 30, or with CE routers 65 or 75. Alternatively, the network router interface can be included in the L3VPN manager 145. The network router interface can automate operations for the CE routers 30, 65 or 75. For instance, any one or more of the CE routers 30, 65, 75 can communicate with the network router interface and atomically request a change in routing for a particular VRF instance. In a non-limiting embodiment, one or more of the CE routers 30, 65 or 75 can communicate with, for example, an API in the key server 35. The API can include an XML API, such as, for example, an API compatible with Extensible Markup Language (XML) processing. The XML API can support available transport layers such as terminal-based protocols, including, for example, Telnet, Secure Shell (SSH), dedicated-TCP connection, or Secure Sockets Layer (SSL) dedicated TCP connection. The API can configure one or more of the CE routers 30, 65, 75, or request information about configuration, management or operation of the router(s). The API can facilitate building a custom end-user interface for configuration and information retrieval and display. The API can supply a CLI or configuration file to the CE router.

The API can provide an interface to the CE router 30, 65 or 75 that can be used by, for example, the key server 35 to develop client applications and scripts (for example, a Perl script) to manage or monitor the CE router. The interface can include an XML interface that can be specified by XML schemas. The API can exchange formatted request or response streams for configuring or monitoring the CE router 30, 65 or 70. The CE router 30, 65 or 75 can process a request and send the request to the key server 35. The key server 35 can include a secure router (not shown). The key server 35 can encode an instruction in, for example, XML API tags, which can be received by the CE router 30, 65 or 75 to update or change the router configuration, including terminating transmission of data packets. The communication signal from the key server 35 can begin, for example, with an XML declaration tag followed by a response tag, one or more operation type tags, and a result summary tag with an error count. A response can be received from the CE router containing operation tags for each supported operation type.

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 180 to any component in the key server 35.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The L3VPN manager 145 can include an Open Shortest Path First (OSPF) topology and process for the main office network 10, or branch office networks 60, 70, or the entire enterprise network environment 1 (shown in FIG. 1) that can work with a link state routing (LSR) algorithm and support a Classless Inter-Domain Routing (CIDR) addressing model and a BGP (Boarder Gateway Protocol) table and process to exchange routing and reachability information among autonomous systems (AS) in the enterprise network environment 1, including CE routers. The L3VPN manager 145 can generate and maintain information that can allow CE routers to make routing decisions based on paths, network policies, or rule-sets according to the technological solution. The L3VPN manager 145 can include, for example, Interior or internal Border Gateway Protocol (IBGP). The L3VPN manager 145 can include BGP extended community attributes to be used for a particular GM or group SA. The L3VPN manager 145 can include IP routing tables and IP forwarding tables, including VRF tables. The routing tables can include lists of routes to particular network destinations, and in some cases, metrics (distances) associated with those routes. The routing tables can contain information about the topology of the main network 10 or the branch office networks 60 or 70.

The L3VPN manager 145 can be configured to operate with the CE router 30 to allow multiple instances of a routing table to co-exist within the CE router 30 at the same time, providing one or more logical or physical interfaces in the CE router 30 without sharing routes and thereby ensuring that data packets are only transmitted between interfaces on the same VRF. The L3VPN manager 145 can be configured to operate with the CE router 30 to handle routing and disseminate routing information to enterprise routers (e.g., PE routers 25) or CE routers 65, 75, as appropriate, where the routing tables can be virtualized. The L3VPN manager 145 can configure the CE router 30 for multiple VRF instances, for example, as shown in FIG. 1, and propagate or cause propagation of routing information using MBGP with a rich set of extended community attributes that can be attached to routes belonging to the VRFs.

According to a non-limiting embodiment, the L3VPN manager 145 can operate with the CE router 30 (shown in FIG. 1) to exchange routes between the enterprise main office network 10 and the branch office networks 60, 70 using MPLS MBGP protocol to exchange the routes. For instance, the L3VPN manager 145 can operate with the CE router 30 to classify the user community within the L3VPN-UD 20 into User-U, User-SP1 and User-SP2 instances, and to provide all routes for branch office networks 60, 70 to the L3VPN-UD 20. Using MBGP, the L3VPN manager 145 can define a set of BGP extended community attributes in the format target: VALUE1:VALUE2, where VALUE1 can include a unique number such as an Autonomous System number (private or public number assigned by IANA) and VALUE2 can include a number chosen to uniquely identify the unicast routes originated from User-U, User-SP1 or User-SP2. Using MPLS VRF route import and export policies, the L3VPN manager 145 can define the policies on the enterprise router interfacing the branch office networks, such as, for example, CE routers 60, 70 (or CE router 30, shown in FIG. 1). The L3VPN manager 145 can trigger exportation of all routes of User-SP1 and User-SP2 instances to User-U instances, and vice versa, attaching the unique BGP attribute defined by the L3VPN manager 145 for that VRF instance. In case of a cyberthreat such as a virus outbreak or network attack, the L3VPN manager 145 can receive an instruction from the cyberthreat remediator 160 to modify the policies at the CE router 30, 65 or 75 to alter or stop routing exchange and alter or stop allowing data packets to pass through the CE router, thereby altering or stopping data packets from travelling between the branch office network 60, 70 side and enterprise main office network 10 side.

The GETVPN unit 150 can include a key generator 154, a GM (Group member) manager 156, or a GDOI (Group Domain of Interpretation) profiler 158, any of which can include a device or module. The key generator 154, GM manager 156 and GDOI profiler 158 can be combined into a single device (not shown). The GETVPN unit 150 can be configured to use, for example, standard ISAKMP authentication schemes like RSA key paring, including digital signatures (or certificates) and pre-shared keys, which can be defined by the key generator 154. The GETVPN unit 150 can be configured with the necessary information, including the IP addresses of the group members and the group SA, as well as the GDOI profile. Working in communication with the L3VPN manager 145, the GETVPN unit 150 can facilitate configuration of the group member routers 30, 65 or 75 with the necessary information, including the IP address of the key server 35 and the group SA as well as the GDOI profile. Once all CE routers are configured, the GETVPN unit 150 can facilitate creation or modification of an encrypted VPN tunnel between the main office network 10 and the branch office network 60 or 70 via the SP1 or SP2 networks 40 or 50, respectively, which will carry all data traffic routed through the encrypted tunnel.

The GETVPN unit 150 can be configured to provide instantaneous large-scale any-to-any IP connectivity using, for example, a group IPsec security paradigm, and taking of underlying IP VPN routing infrastructure in the enterprise network environment 1 without any need for an overlay routing control plane. The GETVPN unit 150 can facilitate seamless integration with multicast infrastructures without the multicast replication issues typically seen in traditional tunnel-based IPsec solutions. The GETVPN unit 150 can also facilitate preservation of IP source and destination addresses during the IPsec encryption and encapsulation process.

The key generator 154 can create and maintain the GETVPN control plane. The key generator 154 can define and provide all encryption policies, including interesting traffic, encryption protocols, security association, and rekey timers. The key generator 154 can push down encryption policies to the CE routers 30, 65 or 70 at time of registration, or push down the encryption policies to the CE router 30 at registration and instruct the CE router 30 to forward the encryption polices to the CE routers 65 or 75. The CE routers 30, 65 or 75 can authenticate with the GM manager 156 using, for example, IKE (e.g., pre-shared keys or PKI) and download the encryption policies and keys from the key generator 154 required for GETVPN operation. The key generator 154 can generate or refresh and distribute one or more keys to the CE routers 30, 65 or 75. Interesting traffic can be defined by the key generator 154 using, for example, an access control list (ACL), which can be downloaded to the CE routers 30, 65 or 75. The ACL can be configured to encrypt all data traffic except, for example, routing data. Any global policy (including both "permit" and "deny" entries) defined by the key generator 154 can affect all GMs of a group SA. A local policy can be included for a particular CE router running a different routing protocol to bypass encryption of the routing protocol traffic, where appropriate, as understood by those skilled in the art.

The encryption policy can be used by the CE routers 30, 65 or 75 to encrypt all traffic leaving the CE router crypto interface. The CE routers 30, 65 and 75 can be responsible for actual encryption and decryption. The CE routers 30, 65 and 75 can be configured with, for example, IKE parameters and key group SA information and, based on downloaded policies, the CE routers can decide whether to encrypt or decrypt traffic and what key to use.

The GM manager 156 can maintain a group member (GM) inventory of all group members and group SAs, including the IP address of each GM and its SA, such that all GMs in a group SA can communicate with each other using a common encryption policy and a shared SA. The GM inventory can include, in addition to the IP address, a fully qualified domain name (FQDN), a distinguished name (DN), email-id and key-id for each group member. The inventory can be updated as new GMs or SAs are added, removed or modified. For instance, one of the CE routers 30, 65 or 75 does not acknowledge a preset (e.g., three) consecutive scheduled rekeys, the GM manager 156 can remove the CE router from its active GM inventory, in which case transmission of rekey messages to the non-responsive CE router can be stopped, which will cause the CE router to be unable to decrypt traffic from other CE routers in the group SA, or render any data traffic encrypted by the CE router undecryptable by other CE routers in the group SA.

In addition to being able to configure traffic policy at the key generator 154, local policies can also be configured at the CE routers 30, 65 or 75 via, for example, the key generator 154 and added to the crypto map. Thus, a local deny policy can be created for policy exceptions that are applicable only to the specific CE router or for policy exceptions that are asymmetric. A global policy can be used for symmetric policy statements. If an asymmetric deny policy is applicable to every GM in the group SA, then it can be configured in the global policy ACL in the key generator 154.

Where rekey multicasting is employed, there may be no need for an acknowledgement (ACK) mechanism, but an active GM inventory should be maintained by the GM manager 156, including a complete and up-to-date inventory of all GMs and group SAs.

The GM manager 156 can maintain a log for each GM, including the operational status of the GM over time, the key, policy, and GDOI profile on the GM. The GM inventory can be maintained such that a new SA can be created before an existing SA expires. For example, if a GETVPN policy results in creation of two SAs on the same CE router 30, then the new SAs would be created before the corresponding two existing SAs expire.

The GDOI profiler 158 can define and manage one or more cryptographic keys and policies for each GM and group SA, including the CE routers 30, 65 or 75. The GDOI profiler 158 can work with the key generator 154 to distribute common IPsec keys to the CE router 30 (or 65 or 75) to operate as enterprise VPN gateway for secure and confidential communication between the main office network 10 and branch office networks 60 or 70 (shown in FIG. 1). The GDOI profiler 158 can work with the key generator 154 to periodically refresh and update keys on all VPN gateways, including the CE router 30 (or 65 or 75). The GDOI profiler 158 can include an Internet Key Exchange (IKE) SA. The CE routers 30, 65 or 75 can authenticate themselves using IKE. The GDOI profiler 158 can support IKE authentication processes such as, for example, RSA key pairings that can include pre-shared keys (PSKs) and public key infrastructure (PKI) for authentication. After the CE routers 30, 65 or 75 are authenticated and provided with the appropriate security keys via the IKE SA, the IKE SA can be allowed to expire and the GDOI profiler 158 can work with the key generator 154 to update the CE routers in a scalable and efficient manner. The GDOI profiler 158 can include different encryption keys, including, for example, Key Encryption Key (KEK) to secure the GETVPN control plane and a Traffic Encryption Key (TEK) to secure the data traffic, as well as the hashes that go with the encryption keys.

According to a non-limiting embodiment, the GDOI profiler 158 can work in conjunction with the key generator 154 and GM manager 156 to interpret an IKE or ISAKMP for a group security domain, as well as pair-wise security associations. The GDOI profiler 158 can use, for example, an IKE security association to authenticate a GDOI member to a GDOI controller. An IKE-GDOI cryptographic protocol exchange can protect a new type of exchange where the GM may request a group state from the GDOI profiler 158. The GDOI profiler 158 can work with the key generator 154 to provide a group key, which can encrypt keys that decrypt application data. A group SA's key-encrypting key can be used for a rekey security association (or Rekey SA). Once the Rekey SA is established, the GDOI profiler 158 can send unsolicited updates to the group SA that includes CE routers 30, 65, 75 over multicast, broadcast or unicast channels.

GDOI group key updates can serve to add, remove or modify GMs in a group SA. The GDOI profiler 158 can include a group membership management protocol that allows selective key updates to GMs in a group SA to efficiently add or remove a GM from the group SA. A GM can belong to one or more group SAs. The GDOI profiler 158 can include an authorization, authentication and accounting (AAA) protocol that can install a certificate to allow a CE router to join a member group.

The cyberthreat remediator 160 can be configured to listen or monitor for any cyberthreat that might occur in a GM or the network 10, 60 or 70. The cyberthreat remediator 160 can be included in the key server 35 as shown in FIG. 2, or it can be included in a security appliance (not shown) in the main office network 10. The cyberthreat remediator 160 can be configured to receive a notification from a security appliance (not shown), a communicating device (not shown) such as a network administrator computing device, a computing resource such as a machine learning platform, or any other technology that can detect, identify or predict a cyberthreat such as a virus, malware or cyberattack in any part of the enterprise network environment 1 (or enterprise network environment 2, shown in FIG. 4), including for example, a computing resource or communicating device located in the main office network 10 or branch office networks 60 or 70. The notification can include the location of the cyberthreat, including for example, the network or the IP address of the affected communicating device. After receiving a cyberthreat notification, the cyberthreat remediator 160 can generate an instruction to generate a new routing policy or modify an existing policy in the affected GM or the GM that channels traffic to the affected communicating device to alter or stop routing data traffic from or to the GM or affected communicating device (not shown), or, more generally, the entire network where the communicating device is located. In this regard, the GM can include the CE router 30, 65 or 75 (shown in FIG. 1) or the firewall 80 (shown in FIG. 4).

The database 175 can include a database management system (DBMS) (not shown), file-based storage system or any storage medium which can receive and process queries in the key server 35 to locate and retrieve data from the database 175. The database 175 can include a DBMS such as, for example, SQL, MySQL, Oracle, Access, or Unix. The database 175 can include a relational database. The database 175 can include the computing resource base and communicating device base for the entire enterprise network, including all communicating devices or computing resources in the main office network 10 and branch office networks 60 and 70. The database 175 can store GM inventory data for all GMs and group SAs in the enterprise network, including the IP addresses of all GM communicating devices and computing resources.

Figure 3:
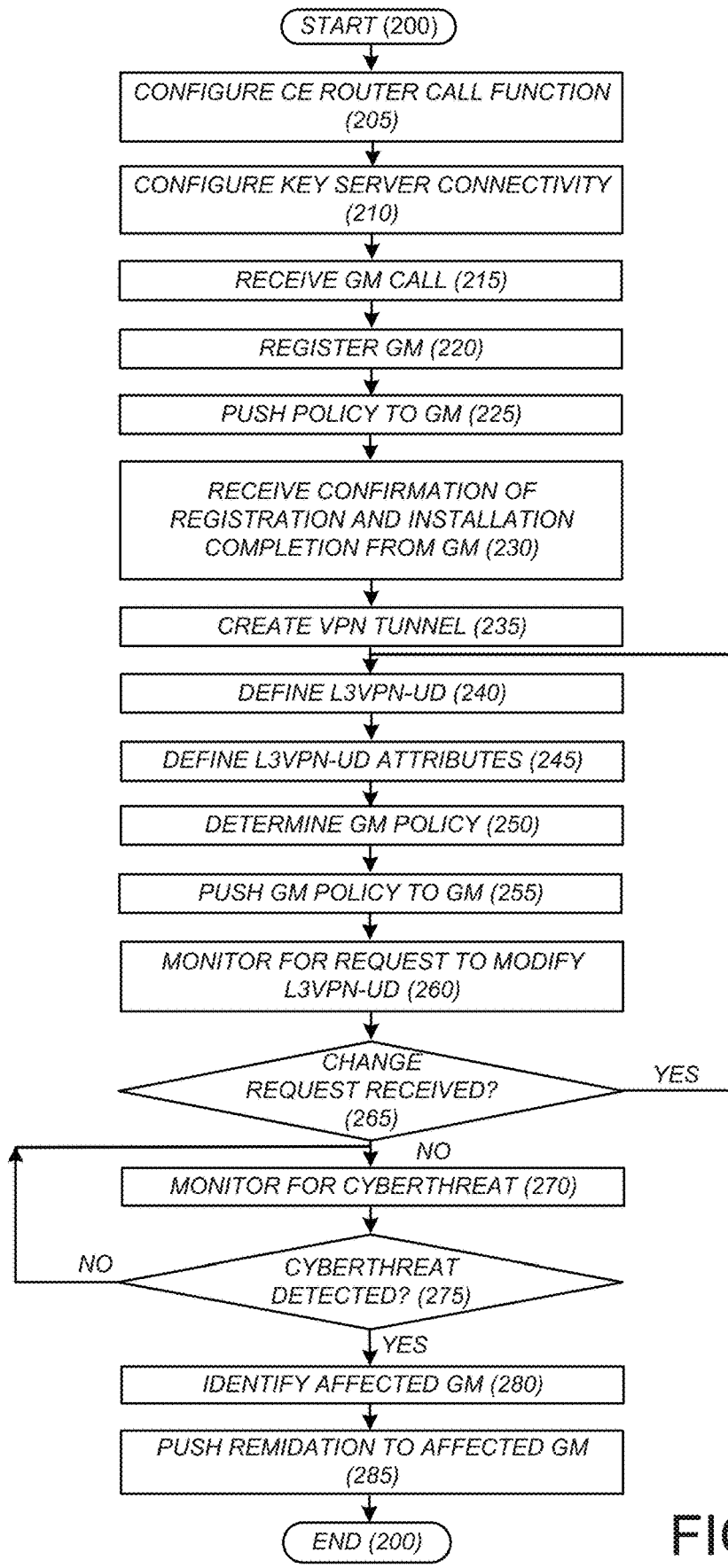
FIG. 3 shows an embodiment of a crypto process that can be carried out by the technological solution in FIG. 1.

FIG. 3 shows a non-limiting embodiment of a crypto process 200 that can be carried out by the technological solution, including the key server 35 (shown in FIG. 1). Initially, before starting the crypto process 200, the key server 35 can be configured with the IP address of each GM, a crypto ISAKMP policy, an RSA key pair, an authentication pre-share key, a key hash, a crypto ISAKMP key GETVPN address, a crypto IPsec profile, a crypto GDOI group, an identity number or group domain, a rekey algorithm identification, a transform set, an ACL, a local IP address for the key server 35 (or any other key server the GMs should call home to), and a crypto-map to be applied. The ACL can include a list of protocols or data types that can be excluded from encryption by one or more of the GMs. The ACL list can include a "deny" or "permit" instruction for certain routing information to enable the GMs to be able to reach the key server 35.

Referring to FIGS. 1 and 3 concurrently, upon initiating the process 200, each GM can be instructed to call home to the key server 35 (Step 205). The GMs can include CE routers 30, 65 or 75 (shown in FIG. 1). The GMs can be provided with a pre-share key to use when calling to the key server 35. The key server 35 can be configured to accept calls from and connect to predetermined GMs (Step 210). Alternatively, the key server 35 can be configured to accept connections from any IP address. The key server 35 can be configured with IP addresses for all GMs. Upon receiving a call from a particular GM (Step 215), the key server 35 can register that GM (Step 220) and pushdown group SA information and the GDOI profile, including IPsec policy and ISAKMP policy, to the GM (Step 225). The key server 35 can provide the GM with a CLI and configuration file for the group SA that the GM belongs to. The GM can then install the policies and send an acknowledgement (ACK) to the key server 35, confirming completion of installation of the policies and registration, including receiving the key/rekey (Step 230). After the key server 35 receives confirmation that all GMs in the group SA have completed registration and installation of policies (Step 230), a VPN tunnel can be created between GMs, such as, for example, between CE routers 30 and 65 and/or CE routers 30 and 75 and all traffic between the main office network 10 and branch office network 60 or 70 can be routed through the tunnel(s) (Step 235).

Using MPLS MBGP protocol to exchange routes between the main network 10 (shown in FIG. 1) and the branch office networks 60 or 70, the LEVPN-UD 20 (shown in FIG. 1) can be defined and the user community classified within the user domain into User-U, User-SP1 and User-SP2 instances, with User-U instances representing main office network 10 users and User-SP1 and User-SP2 instances representing branch office network 60, 70 users (Step 240). All routes for the branch office networks 60, 70 can be part of the L3VPN-UD 20. Using MBGP, a set of BGP extended community attributes can be defined in a format such as, for example, target: VALUE1:VALUE2 where VALUE1 can include an Autonomous System number (private or public number assigned by IANA) and VALUE2 can include a number chosen to uniquely identify the unicast routes originated from User-U, User-SP1 and User-SP2 instances (Step 245). Using MPLS VRF route import and export policies, a policy can be defined (Step 250) and pushed down to the GM interfacing the branch office networks 60, 70 (Step 255). For instance, a policy can be defined and pushed down to the GM that defines all routes of User-SP1 and User-SP2 instances must be exported to User-U and vice versa, attaching the unique BGP attribute defined in Step 245 for that VRF.

The key server 35 can receive requests to add, remove or modify GMs in the L3VPN-UD 20 (Step 260). This can occur where a new CE router or VRF instance is added, or an existing CE router or VRF instance is removed or modified. If a change request is received (YES at Step 265), then the process 200 can revert to Step 240, otherwise the key server 35 can monitor for any indication of a cyberthreat (NO at Step 265, then Step 270). In this regard, the cyberthreat remediator 160 can listen for any indication that a GM or an associated communicating device or network has been compromised or exposed to a cyberthreat. The indication can be received from, for example, a network security appliance (not shown), a communicating device (not shown), a computing resource, or other cyberthreat detection, identification or prediction technology, which can be located in the main office network 10 or the branch office network 60 or 70.

In case a cyberthreat such as a virus outbreak or network attack is determined (YES at Step 275), then the affected GM can be identified (Step 280) and the policies for the affected GM modified and pushed down to the GM to alter or stop routing exchange or alter or stop traffic from passing through the GM to/from the main network 10 or the branch office networks 60 or 70 (Step 285). For instance, the key server 35 can define and push down IPsec and ISAKMP policies to stop routing certain types of data or to stop routing all data traffic, thereby quarantining the affected GM, communicating device(s) or network from non-affected communicating devices or computing resources or networks.

Figure 4:
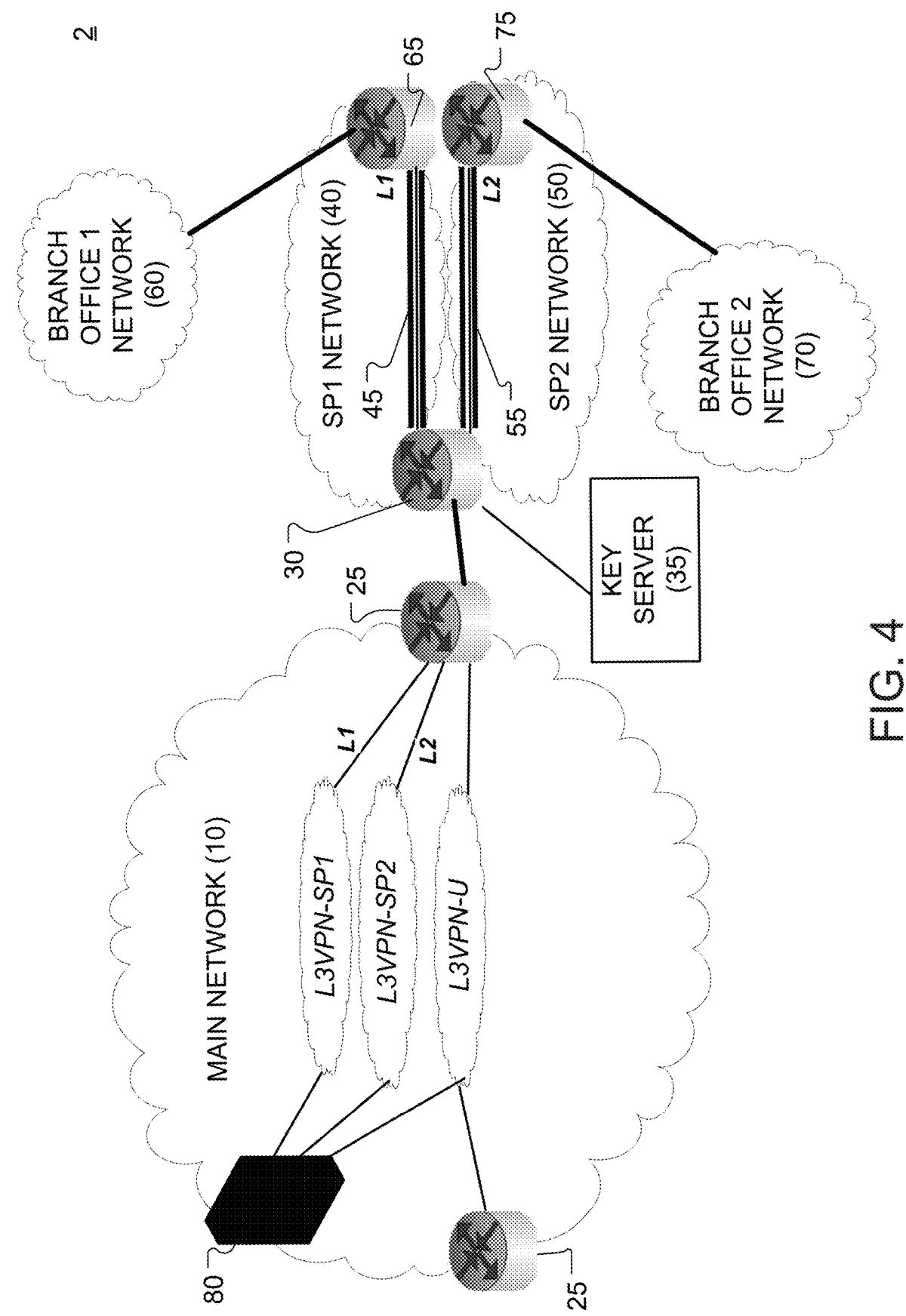
FIG. 4 shows another example of an enterprise network environment including to the technological solution according to the principles of the disclosure.

FIG. 4 shows another non-limiting example of an enterprise network environment 2 provided with the technology solution according to the principles of the disclosure. In this example, the enterprise network environment 2 can include a firewall 80 in addition to the other components that can be included in the enterprise network environment 1 (shown in FIG. 1). Like the enterprise network environment 1, the enterprise network environment 2 can span a wide geographic area and interconnect enterprise network users in the branch office networks 60, 70 and the main office network 10 to provide enterprise network users with access to computing resources in the main network 10 and branch office networks 60, 70. In this example, L3VPN-SP1 and L3VPN-SP2 instances can be provided by the service providers SP1 40 and SP2 50 and dedicated to providing interconnectivity between the branch office networks 60, 70 and the main network 10. The L3VPN-U instance can be provided by the MPLS core network in the backbone of the main office network 10 and dedicated to providing interconnectivity for users in the main network 10. The L3VPN-SP1, L3VPN-SP2 and L3VPN-U instances can each include a VRF instance and can be configured so that all users in the main network 10 and branch office networks 60, 70 can have access to computing resources hosted within the main office network 10 or branch office networks 60, 70, while keeping all data traffic traversing through the SP1 and SP2 networks 40, 50 confidential and safe from unauthorized entities.

In the enterprise network environment 2, the firewall 80 can be configured to exchange routing. Further to the description provided above with respect to the enterprise network environment 1, the users in the enterprise network environment 2 can be classified into different L3VPN (or VRF) instances using MPLS; namely, L3VPN-U, L3VPN-SP1, and L3VPN-SP2 instances, where the L3VPN-U instance includes main office network 10 users and the L3VPN-SP1 and L3VPN-SP2 instances include users in the branch office networks 60 and 70, respectively. The L3VPN-SP1 and L3VPN-SP2 instances can be private isolated VRF instances comprising respective ports on the CE router 30 (or 65 or 75) facing the branch office networks 60, 70 and an interface (not shown) in the firewall 80, which can include an enterprise router (not shown) that hosts the firewall.

To satisfy enterprise requirements, whereby inter-communication can be required between main office network 10 users from one side and branch office network 60, 70 users on the other side, the firewall 80 can be positioned in a centralized location in the main office network 10 where all traffic requiring to cross from one user group to the other will be directed. When such traffic hits the firewall 80, the configured policies in the firewall 80 can determine whether such traffic is allowed or not. The firewall 80 can create a policy to allow routes exchanges between User-U, User-SP1 and User-SP2 members in the L3VPN-U, L3VPN-SP1 and L3VPN-SP2 instances. In case of a cyberthreat such as a virus outbreak or a network attack from any section of the VRF instances (L3VPN-U, L3VPN-SP1 or L3VPN-SP2 instances), the policies at the firewall 80 can be modified to alter or stop allowing exchanging of routes or to alter or stop data traffic from passing through the VRF instances at any one or more of the main office network 10 or branch office networks 60 or 70.

Figure 5:
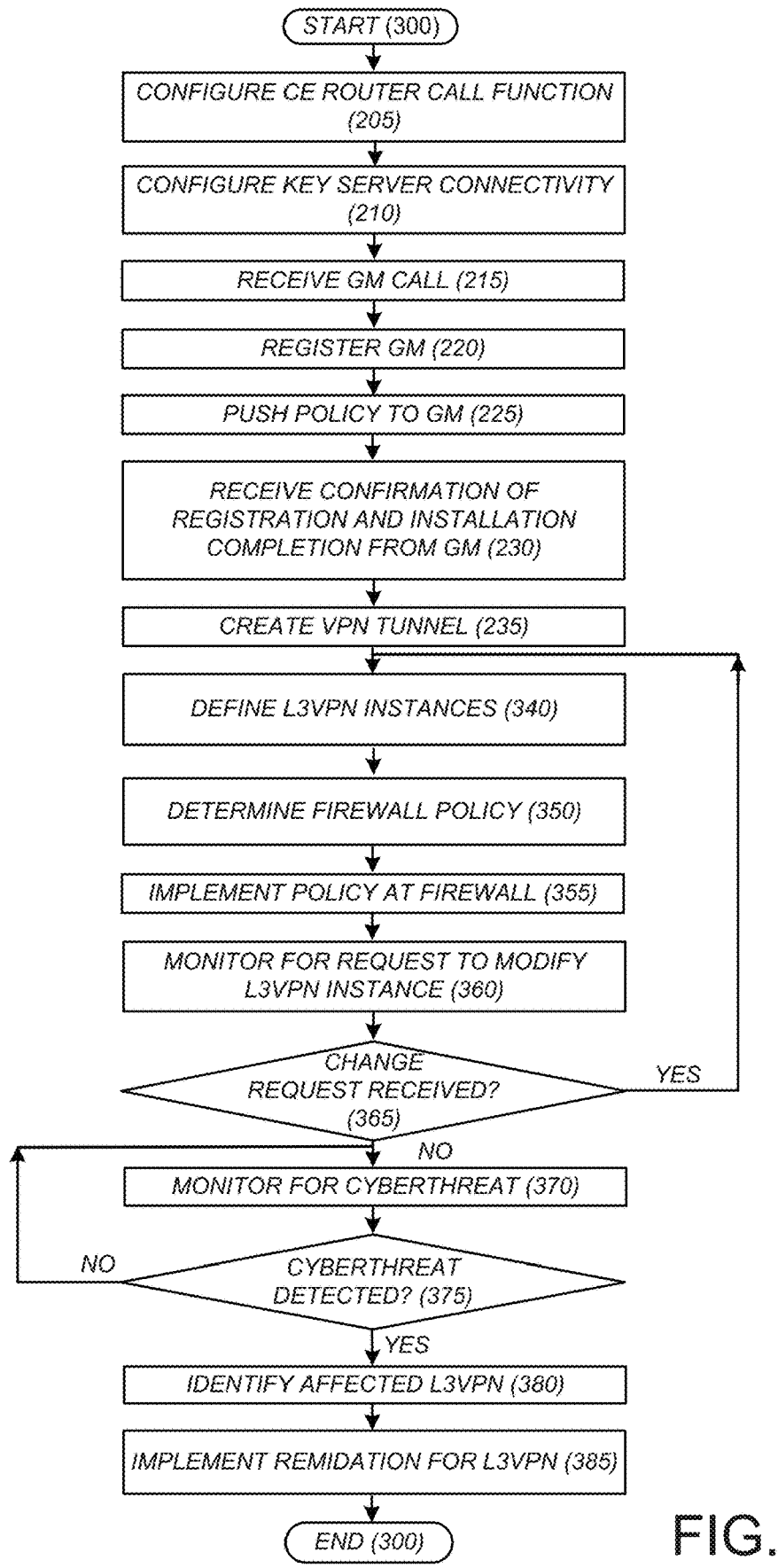
FIG. 5 shows an embodiment of a crypto process that can be carried by the technological solution in FIG. 4.

FIG. 5 shows a non-limiting embodiment of a crypto process 300 that can be carried out by the key server 35 and firewall 80 in the enterprise network environment 2 (shown in FIG. 4). Similar to the crypto process 200 (shown in FIG. 3), initially, before starting the crypto process 300, the key server 35 can be configured with, for example, the IP addresses of all GMs, a crypto ISAKMP policy, an RSA key pair, an authentication pre-share key, a key hash, a crypto ISAKMP key GETVPN address, a crypto IPsec profile, a crypto GDOI group, an identity number or group domain, and a rekey algorithm identification. Upon initiating the process 300, Steps 205 to 235 in this process 300 can be carried out in substantially the same way as Steps 205 to 235 in the process 200 (shown in FIG. 3) discussed above, which is incorporated here in its entirety to avoid redundancy.

Referring to FIGS. 4 and 5 concurrently, after a VPN tunnel is created between GM CE routers 30 and 65 and/or GM CE routers 30 and 75, for routing all traffic between the GMs (Step 235), L3VPN (or VRF) instances can be defined for each of the user sets, including User-U, User-SP1, and User-SP2 (Step 340). In this regard, each user can be classified with an appropriate L3VPN instance using MPLS such that User-SP1 and User-SP2 members are private isolated VRFs consisting of the respective ports on the CE router 30 (or 65 or 75) facing the branch office networks 60 and 70, respectively, and an interface (not shown) in the firewall 80 (or router hosting the firewall). A firewall policy can be created (Step 350) and implemented at the firewall 80 (Step 355) that, for example, defines the types of data traffic that can be allowed to pass through the firewall 80.

According to a non-limiting implementation of the disclosure, users from networks SP1 40 and SP2 50 (shown in FIGS. 1 and 4) can reach the PE router 25 through CE router 30. On the PE router 25 interfaced with the CE router 30, L3VPN-SP1, L3VPN-SP2, and L3VPN-U instances (each of which can include a VRF) can be created. The CE router 30 (or PE router 25) can include a policy for incoming data that specifies IP addresses belonging to SP1 40 should be part of L3VPN-SP1 and IP addresses belonging to SP2 50 should be part of L3VPN-SP2 instances. Accordingly, users at each site can be isolated via the CE router 30 (or PE router 25) to the main network 10. The link between the CE router 30 and PE router 25 can be segregated logically by creating a sub-interface for each L3VPN between the PE router 25 and CE router 30.

In this implementation, on the PE router 25 interfaced with CE router 30 (shown in FIGS. 1 and 4), VRFs can be created, including L3VPN-U, L3VPN-SP1, and L3VPN-SP2, and user communities can be tagged in the policies including, for example, User-U, User-SP1 and User-SP2 communities. Regarding the L3VPN-SP1, a policy for SP1 40 can be exported (for example, from the PE router 25) that requires that network subnets be created for SP1 users, and the users added to the User-SP1 community, otherwise rejected. Relatedly, the policy for SP1 40 can be imported (for example, by the PE router 25) that requires that subnets from L3VPN-U exclude tagged subnets from user communities User-SP1 and User-SP2.

Regarding L3VPN-SP2, a policy for SP2 50 can be exported (for example, from the PE router 25) that requires that network subnets be created for SP2 users and the SP2 users be added to the User-SP2 community, otherwise rejected. Relatedly, the policy for SP2 50 can be imported (for example, by the PE router 25) that requires that subnets from L3VPN-U excluded tagged subnets from user communities User-SP1 and User-SP2.

Regarding L3VPN-U, a policy for user community User-U can be imported (for example, by the PE router 25) and User-SP1 and User-SP2 communities tagged and excluded from the User-U community, otherwise rejected. Relatedly, the policy for User-U community can be exported (for example, from the PE router 25) that requires network subnets for User-U users and the users added to the User-U community. When a cyberthreat is detected, such as a virus outbreak or a network attack from any section of the VRF instances (L3VPN-U, L3VPN-SP1 or L3VPN-SP2 instances), the policies can be deactivated from the affected VRF instance.

According to another non-limiting implementation of the disclosure, a policy can be configured on a PE router 25 such that all VRFs (e.g., L3VPN-SP1, L3VPN-SP2, and L3VPN-U instances) are available in the PE router 25 that has connectivity to the filtering firewall 80 (shown in FIG. 4). For the connectivity link between the PE router 25 and firewall 80, sub-interfaces can be crated for each VRF instance as follows: a sub-interface for L3VPN-U; a sub-interface for L3VPN-SP1; and, a sub-interface for L3VPN-SP2. Relatedly, on the firewall 80, the following policy can be created: route leak between L3VPN-U and L3VPN-SP1, excluding L3VPN-SP2; route leak between L3VPN-U and L3VPN-SP2, excluding L3VPN-SP1; and users in SP1 and SP2 are not allowed to communicate with each other. When a cyberthreat is detected, such as a virus outbreak or a network attack from any section of the VRF instances (L3VPN-U, L3VPN-SP1 or L3VPN-SP2 instances), the firewall policy can be deactivated for the affected VRF (e.g., L3VPN-U, or L3VPN-SP1, or L3VPN-SP2).

The key server 35 can receive a request to add, remove or modify group members in the L3VPN-U, L3VPN-SP1 or L3VPN-SP2 instances (Step 360). If a change request is received (YES at Step 365), then the process 300 can revert to Step 340, otherwise the key server 35 can monitor for any indication of a cyberthreat (NO at Step 365, then Step 370). In this regard, the cyberthreat remediator 160 can listen for any indication that a GM (or an associated communicating device (not shown), computing resource or network) has been compromised or exposed to a cyberthreat. The indication can be received from, for example, the firewall 80, a network security appliance (not shown), communicating device (not shown) such as an administrator communicating device, a computing resource, or any other cyberthreat detection technology that can detect, identify or predict a cyberthreat in the main office network 10 or the branch office network 60 or 70.

In case a cyberthreat such as a virus outbreak or network attack is determined (YES at Step 375), then the affected GM can be identified (Step 380) and the policies for the firewall 80 or the affected GM modified and pushed down to the firewall 80 or GM to alter or stop routing exchange or to alter or stop allowing traffic to pass through the affected GM to/from the main network 10 or the branch office networks 60 or 70 (Step 385). For instance, the key server 35 can define and push down IPsec and ISAKMP policies to alter or stop routing certain types of data or to alter or stop routing all data traffic, thereby quarantining the affected communicating device(s) from non-affected communicating devices or computing resources.

The terms "a," "an," and "the," as used in this disclosure, means "one or more," unless expressly specified otherwise.

The term "backbone," as used in this disclosure, means a transmission medium or infrastructure that interconnects one or more computing devices or communicating devices to provide a path that conveys data packets and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any computing device, hardware, firmware, or software that can transmit or receive data packets, instruction signals or data signals over a communication link. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for securely connecting a main network to one or more subnetworks in an enterprise network through a group of enterprise routers, wherein the enterprise routers comprise at least one provider router and at least one customer edge (CE) router, the method comprising:
   providing a key server including a key generator;
   configuring the key server with:
      an Internet Protocol (IP) address for each router in the group of enterprise routers,
      a group security association (SA) value for the group of enterprise routers; and
      a group profile for the group of enterprise routers;
   configuring each router in the group of enterprise routers with an Internet Protocol (IP) address for the key server and the group security association (SA) and the group profile;
   generating an encryption key using the key generator of the key server;
   creating an encrypted virtual private network (VPN) tunnel between the main network and a subnetwork using the encryption key;
   routing all data traffic between the main network and the subnetwork through the encrypted virtual private network (VPN) tunnel;
   monitoring, using the key server, all data traffic in the encrypted VPN tunnel for a cyberthreat notification in the enterprise network, wherein the notification includes a location having an address of the cyberthreat;
   receiving the cyberthreat notification at a cyberthreat remediator of the key server; and
   remediating a cyberthreat identified in the cyberthreat notification at the cyberthreat remediator using the address,
   wherein remediating the cyberthreat comprises modifying a policy that is performed in at least one of the CE routers included in the group of enterprise routers to stop routing exchange using the address or cease encryption or transmission of data between the main network and the one or more subnetworks having the address.

2. The method in claim 1, further comprising:
   classifying a community of network users in a Virtual Routing and Forwarding (VRF) domain that includes all routes between the main network and the one or more subnetworks into a User-U instance, a User-SP1 instance and a User-SP2 instance,
   where the User-U instance represents network users in the main network and the User-SP1 and User-SP2 instances represent network users in two subnetworks.

3. The method in claim 2, further comprising:
   defining a Border Gateway Protocol (BGP) extended community attribute,
   wherein the BGP extended community attribute comprise a number value that identifies a unicast route originated from one of the User-U, User-SP1 or User-SP2 instances.

4. The method in claim 3, further comprising:
   defining a router policy in said one of the group of enterprise routers using MultiProtocol Label Switching (MPLS) Virtual Routing and Forwarding (VRF) route import or export policies,
   wherein the router policy instructs said one of the group of enterprise routers to export all routes of User-SP1 and User-SP2 instances to the User-U instance together with the BGP extended community attribute.

5. The method in claim 3, further comprising:
defining a router policy in said one of the group of enterprise routers using MultiProtocol Label Switching (MPLS) Virtual Routing and Forwarding (VRF) route import or export policies,
wherein the router policy instructs said one of the group of enterprise routers to export all routes of the User-U instance to the User-SP1 and User-SP2 instances together with the BGP extended community attribute.

6. The method in claim 1, further comprising:
defining a set of Border Gateway Protocol (BGP) extended community attributes.

7. The method in claim 1, further comprising:
defining a router policy in said one of the group of enterprise routers using MultiProtocol Label Switching (MPLS) Virtual Routing and Forwarding (VRF) route import or export policies.

8. The method in claim 7, wherein the router policy instructs said one of the group of enterprise routers to export all routes of User-SP1 and User-SP2 instances to a User-U instance, where the User-U instance represents network users in the main network and the User-SP1 and User-SP2 instances represent network users in two subnetworks.

9. The method in claim 7, wherein the router policy instructs said one of the group of enterprise routers to export all routes of a User-U instance to User-SP1 and User-SP2 instances, where the User-U instance represents network users in the main network and the User-SP1 and User-SP2 instances represent network users in two subnetworks.

10. The method in claim 1, wherein the group profile comprises a Group Domain of Interpretation (GDOI) profile.

11. The method in claim 1, further comprising:
classifying users in the enterprise network with different Virtual Routing and Forwarding (VRF) using Multi-Protocol Label Switching into a User-U instance, a User-SP1 instance and a User-SP2 instance,
where the User-U instance represents users in the main network and the User-SP1 and User-SP2 instances represent users in two subnetworks.

12. The method in claim 11, wherein the User-SP1 and User-SP2 instances are private isolated Virtual Routing and Forwarding (VRF) instances that comprise respective ports on said one of the group of enterprise routers facing the two subnetworks and an interface in a router hosting a firewall.

13. The method in claim 11, wherein the firewall is positioned in the main network where all data traffic requiring to cross from one user group to another user group in the User-U, User-SP1 or User-SP2 instances must pass through the firewall.

14. The method in claim 11, wherein the firewall comprises a policy that determines whether to allow routes exchanges between User-U, User-SP1 or User-SP2 instances.

15. A system for securely connecting a main network to one or more subnetworks in an enterprise network through a group of enterprise routers, wherein the enterprise routers comprise at least one provider router and at least one customer edge (CE) router, including a router that creates a virtual private network (VPN) tunnel between the main network and a subnetwork, the system comprising:
a key server having:
a key generator configured to generate an encryption key and to encrypt the VPN tunnel:
a GETVPN unit that includes an Internet Protocol (IP) address for each router in the group of enterprise routers, a group security association (SA) value for the group of enterprise routers, and a group profile for the group of enterprise routers,
an L3VPN manager that works with the GETVPN unit to configure each router in the group of enterprise routers with an Internet Protocol (IP) address for the key server and the group security association (SA) and the group profile, and
a cyberthreat remediator comprising a hardware processor and a memory comprising software instructions executed to monitor all data traffic in the encrypted VPN tunnel for a cyberthreat notification, wherein the notification includes a location having an address of the cyberthreat, and, upon receiving the cyberthreat notification, modify a policy that is performed in at least one of the CE routers included in the group of enterprise routers to stop routing exchange using the address or cease encryption or transmission of data between the main network and the subnetwork having the address.

16. A non-transitory computer readable storage medium storing network connectivity program instructions for securely connecting a main network to one or more subnetworks in an enterprise network through a group of enterprise routers, wherein the enterprise routers comprise at least one provider router and at least one customer edge (CE) router, the program instructions comprising the steps of:
providing a key server including a key generator;
configuring the key server with:
an Internet Protocol (IP) address for each router in the group of enterprise routers,
a group security association (SA) value for the group of enterprise routers, and
a group profile for the group of enterprise routers;
configuring each router in the group of enterprise routers with an Internet Protocol (IP) address for the key server and the group security association (SA) and the group profile;
generating an encryption key using the key generator of the key server;
creating an encrypted virtual private network (VPN) tunnel between the main network and a subnetwork using the encryption key;
routing all data traffic between the main network and the subnetwork through the encrypted virtual private network (VPN) tunnel;
monitoring, using the key server, all data traffic in the encrypted VPN tunnel for a cyberthreat notification in the enterprise network, wherein the notification includes a location having an address of the cyberthreat;
receiving the cyberthreat notification at a cyberthreat remediator of the key server; and
remediating a cyberthreat identified in the cyberthreat notification at the cyberthreat remediator using the address, wherein remediating the cyberthreat comprises modifying a policy that is performed in at least one of the CE routers included in the group of enterprise routers to stop routing exchange using the address or cease encryption or transmission of data between the main network and the one or more subnetworks having the address.

17. The non-transitory computer readable storage medium in claim 16, the program instructions comprising the further step of:
classifying a community of network users in a Virtual Routing and Forwarding (VRF) domain that includes all routes between the main network and the one or more subnetworks into a User-U instance, a User-SP1 instance and a User-SP2 instance, where the User-U instance represents network users in the main network and the User-SP1 and User-SP2 instances represent network users in two subnetworks.

18. The non-transitory computer readable storage medium in claim 16, the program instructions comprising the further steps of:

defining a Border Gateway Protocol (BGP) extended community attribute, wherein the BGP extended community attribute comprise a number value that identifies a unicast route originated from one of the User-U, User-SP1 or User-SP2 instances.

19. The non-transitory computer readable storage medium in claim 18, the program instructions comprising the further step of: defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of User-SP1 and User-SP2 instances to the User-U instance together with the BGP extended community attribute.

20. The non-transitory computer readable storage medium in claim 18, the program instructions comprising the further step of:

defining a router policy in said one of the group of enterprise routers using MultiProtocol Label Switching (MPLS) Virtual Routing and Forwarding (VRF) route import or export policies, wherein the router policy instructs said one of the group of enterprise routers to export all routes of the User-U instance to the User-SP1 and User-SP2 instances together with the BGP extended community attribute.

* * * * *